United States Patent
Haseltine et al.

(10) Patent No.: US 9,285,660 B2
(45) Date of Patent: Mar. 15, 2016

(54) ANIMATED DOCUMENT USING AN INTEGRATED PROJECTOR

(71) Applicant: Disney Enterprises, Inc., Burbank, CA (US)

(72) Inventors: Eric C. Haseltine, Silver Spring, MD (US); Katie M. Bassett, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 191 days.

(21) Appl. No.: 14/024,356

(22) Filed: Sep. 11, 2013

(65) Prior Publication Data

US 2015/0070264 A1 Mar. 12, 2015

(51) Int. Cl.
| | |
|---|---|
| *G03B 21/10* | (2006.01) |
| *G03B 21/28* | (2006.01) |
| *G03B 21/30* | (2006.01) |
| *G06F 3/048* | (2013.01) |
| *G03B 21/62* | (2014.01) |
| *G03B 29/00* | (2006.01) |

(52) U.S. Cl.
CPC ............... *G03B 21/10* (2013.01); *G03B 21/28* (2013.01); *G03B 21/30* (2013.01); *G03B 21/62* (2013.01); *G03B 29/00* (2013.01); *G06F 3/048* (2013.01)

(58) Field of Classification Search
CPC ..... G06F 1/1647; G06F 1/1649; G06F 1/165; G06F 1/1652; G06F 1/1654; G06F 15/0291; G06F 2203/04101; G06F 3/0425; G03B 21/14
USPC .................. 345/204; 353/28, 30, 69
See application file for complete search history.

(56) References Cited

U.S. PATENT DOCUMENTS

| | | | | |
|---|---|---|---|---|
| 4,739,567 | A * | 4/1988 | Cardin | G09F 19/18 359/460 |
| 5,437,552 | A * | 8/1995 | Baer | G09B 5/062 434/308 |
| 5,788,286 | A * | 8/1998 | Hunt | A63H 33/38 281/38 |
| 6,241,527 | B1 * | 6/2001 | Rast | 434/327 |
| 6,405,167 | B1 * | 6/2002 | Cogliano | 704/251 |
| 7,110,796 | B2 * | 9/2006 | Lee | G02B 27/0103 345/32 |
| 7,402,042 | B2 * | 7/2008 | Kelley et al. | 434/178 |
| 7,469,494 | B2 * | 12/2008 | Katz | G09F 11/29 345/2.1 |
| 7,495,633 | B2 * | 2/2009 | Oku et al. | 345/2.3 |
| 8,084,081 | B2 * | 12/2011 | Fujii et al. | 427/66 |
| 8,281,142 | B2 * | 10/2012 | Jung et al. | 713/179 |
| 2001/0018809 | A1 * | 9/2001 | Heropoulos | G06F 1/1601 40/544 |
| 2001/0051329 | A1 * | 12/2001 | Lynch et al. | 434/317 |
| 2002/0008690 | A1 * | 1/2002 | Cooper | G06F 3/0238 345/156 |
| 2002/0055938 | A1 * | 5/2002 | Matsuo et al. | 707/104.1 |
| 2003/0011581 | A1 * | 1/2003 | Tanaka | G09G 3/3688 345/204 |
| 2003/0020701 | A1 * | 1/2003 | Nakamura et al. | 345/204 |
| 2003/0175672 | A1 * | 9/2003 | Kim | B42D 3/123 434/317 |

(Continued)

*Primary Examiner* — Christopher E Leiby

(74) *Attorney, Agent, or Firm* — Patterson & Sheridan, LLP

(57) ABSTRACT

The embodiments presented herein describe integrating a projector in a book to display images or animations on one or more pages of the book. Specifically, the book may include a projector that is arranged in the form factor of the book. The book may also contain one or more mirrors that reflect an image from the projector onto a desired location on a page in the book. In one embodiment, the image is projected from the rear of the book onto a back side of the page that is opposite the front side of the page facing the user. So long as the material of the page is sufficiently translucent, the image projected on the back side of the page will be visible to the user looking at the front side of the page.

21 Claims, 7 Drawing Sheets

(56) References Cited

U.S. PATENT DOCUMENTS

| | | | |
|---|---|---|---|
| 2004/0070633 A1* | 4/2004 | Nakamura et al. | 345/860 |
| 2004/0104890 A1* | 6/2004 | Caldwell | G09B 5/06 345/156 |
| 2004/0257301 A1* | 12/2004 | Ari | B42D 19/005 345/30 |
| 2006/0017659 A1* | 1/2006 | Ogawa et al. | 345/30 |
| 2007/0124673 A1* | 5/2007 | Trotto | G06F 1/1626 715/700 |
| 2007/0195009 A1* | 8/2007 | Yamamoto et al. | 345/1.1 |
| 2009/0091710 A1 | 4/2009 | Huebner | |
| 2012/0054822 A1* | 3/2012 | Dvorak et al. | 726/1 |
| 2012/0300275 A1* | 11/2012 | Vilardell | G06F 1/1626 359/32 |

\* cited by examiner

ANIMATED DOCUMENT USING AN INTEGRATED PROJECTOR

BACKGROUND

1. Field of the Invention

Embodiments presented in this disclosure relate to displaying an image in a book, and more specifically, to displaying the image using a projector integrated into the form factor of the book.

2. Description of the Related Art

As the popularity of electronic media has risen, the circulation of printed media (e.g., newspapers, books, journals, etc.) has decreased. For example, electronic readers (e.g., e-readers) enable people to store a plurality of books in a single electronic device which enhances portability and may reduce costs. Even bedtime stories, which have traditionally been delivered in the form of a book, may be delivered using a tablet, laptop, smartphone, or other interactive electronic device. These devices include user interaction systems such a touch sensor, display screen, and sound modules that may be preferred by the child. For example, the child may be able to influence the story by touching the screen or pressing a button. Although a child may be able to interact with certain types of books (e.g., pop-up books, touch-and-feel books, etc.), the ability of a user to interact with a printed book is limited.

SUMMARY

One embodiment presented herein include a document with a front cover and a back cover. The book includes at least one translucent page between the front and back covers and containing printed text and a projector mounted between the front and back covers. The projector is configured to transmit an image onto a rear side of the translucent page that is opposite a front side of the translucent page being viewed by a user. Furthermore, the translucent page is adapted to allow the image to pass through the translucent page and be displayed on the front side of the translucent page.

Another embodiment presented herein is a system including a document and an external environmental altering device. The book includes a front cover and a back cover and at least one translucent page between the front and back covers and containing printed text. The book also includes a projector mounted between the front and back covers where the projector is configured to transmit an image onto a rear side of the translucent page that is opposite of a front side of the translucent page being viewed by a user. Furthermore, the translucent page is adapted to allow the image to pass through the translucent page and be displayed on the front side of the translucent page. The environmental altering device is configured to receive an instruction via the communication adapter and alter a physical environment that includes the document.

Another embodiment presented herein includes a method for displaying an image on a translucent page of a document. The method includes instructing a projector integrated into the document to emit the image where the projector is mounted between a front cover and a back cover of the document. The method also includes emitting the image from the projector onto a rear side of the translucent page of the document that is opposite a front side of the translucent page being viewed by a user such that the image passes through the translucent page and is displayed on the front side of the translucent page.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
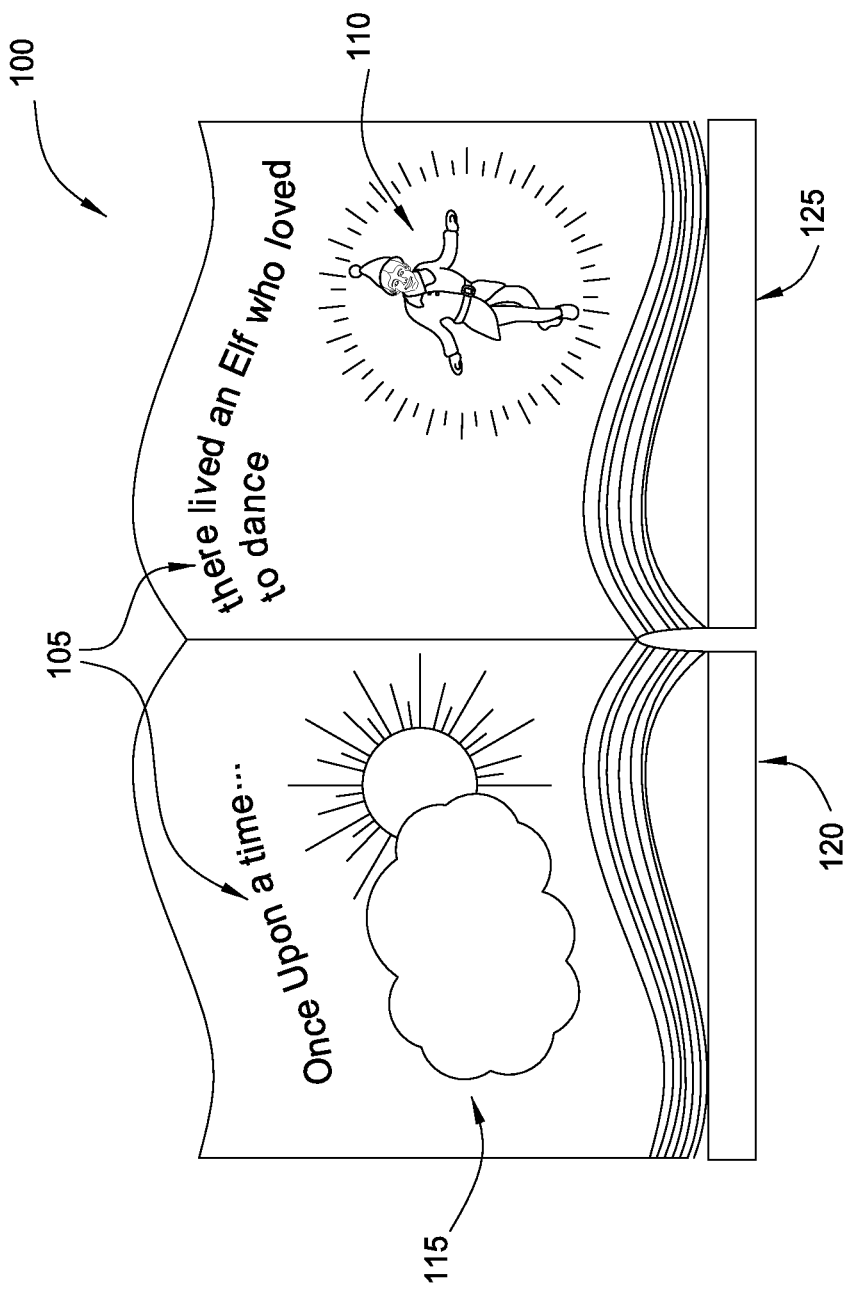
FIG. 1 illustrates a book with an integrated projector, according to one embodiment described herein.

To immerse a user in a book, the book may include an integrated projector that displays images or animations on one or more pages of the book. Specifically, the book may include a projector that is arranged in the form factor of the book. The book may also contain one or more mirrors that reflect an image emitted by the projector onto a desired location on a page in the book. In one embodiment, the image is projected onto a back side of the page that is opposite a front side of the page currently facing the user. So long as the material of the page is sufficiently translucent, the image projected on the back side of the page will be visible to the user looking at the front side of the page.

Further, the book may receive user input and respond to that input by altering what image is displayed on the page. The book, for example, may include a voice recognition system that identifies specific words spoken by the user. Based on the identified word, the book may change the image displayed on the page. In another example, the book may contain a touch sensor that determines where on a page the user is touching. Based on a finger's movement, the book may move an animation to a different portion of the page.

In addition to changing the image displayed on the page, the book may be communicatively coupled to environmental altering devices that further immerse the user in the book's story. For example, the book may be coupled to a sound system, interactive toy, secondary display device, lighting system, etc. that can alter the physical environment surrounding the book to correspond to the story. For example, upon determining that the user is reading a part of the story where the events are taking place in a thunderstorm, the book may communicate with the environmental elements to dim the lights or simulate thunder or lightning. In this manner, a book may be modified to provide an immerse environment but retain the traditional physical appearance commonly associated with a book—e.g., pages that turn, paper material, printed text, etc.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and block diagrams of methods, apparatus (systems) and computer program products according to embodiments of the invention. It will be understood that each block of the flowchart illustrations and block diagrams, and combinations of blocks in the flowchart illustrations and block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and block diagram block or blocks.

FIG. 1 illustrates a book 100 with an integrated projector, according to one embodiment described herein. Like a traditional book, book 100 includes one or more pages that include printed text 105. The example of a children's book will be provided in the embodiments below, but the disclosure is not limited to such. Instead, the examples provided below may be applied to any printed document that includes one or more pages.

Here, book 100 includes a plurality of pages that a user can flip or turn. Book 100 also includes two electronic storage portions 120, 125 that are integrated into the form factor of the book. In one embodiment, the boundaries of the electronic storage portions 120, 125 are designed to fit within the boundaries of the book covers. While a traditional book only includes a cover which protects the pages and provides additional support to the book, book 100 includes the electronic storage portions 120, 125 that may each include components for displaying images on the pages of the book. In one embodiment, the electronic storage portions 120, 125 may serve as one portion of the cover of the book—e.g., portion 120 serves as the front cover of book 100 while portion 125 serves as the back cover. Although book 100 includes two electronic storage portions 120, 125, in another embodiment, book 100 may include only one of these portions.

The electronic storage portions may be a plastic or metal casing that encapsulates an area that contains a projector (not shown) which displays an image or animation on one of the pages. Here, the projector in electronic storage portion 120 displays image 115 onto the left page while the projector in electronic storage portion 125 displays image 110 on the right page. Specifically, the projectors may project the images 110, 115 onto the rear-facing side of the pages currently being viewed by the user. That is, the book 100 may project the image onto the side of the page that is not viewable by the user. Nonetheless, the material of the paper may be translucent which permits the image displayed on the rear or back side to pass through the page, and thus, be visible on the front side. Accordingly, the thickness of the paper is selected (which may vary according to the material of the page) so that light can pass through the page and the image displayed on the rear-facing side of the page is viewable by the user.

In one embodiment, the book 100 may include only projected images 110, 115. That is, instead of printed text, the book 100 may project text onto the pages 225. Using FIG. 1 as an example, instead of being printed, text 105 may displayed on the page using a projector at the same time as the images 110 and 115. In one embodiment, the text 105 may be projected on the page in a manner that makes the text 105 appear like it is currently being written on the page by an unseen hand.

As will be discussed later, book 100 may include software, firmware, or hardware that provides logic for displaying the images 110, 115 on the pages. For example, book 100 may include a sensor that determines what page the user is currently viewing and selects the appropriate image to display and the appropriate location of the page to display the image. In addition, book 100 may include other logic for identifying other forms of user interaction such as touch, user contact with the page, voice recognition, and the like. Book 100 may use these forms of user interactions to change the displayed images or alter the surrounding environment.

Figure 2:
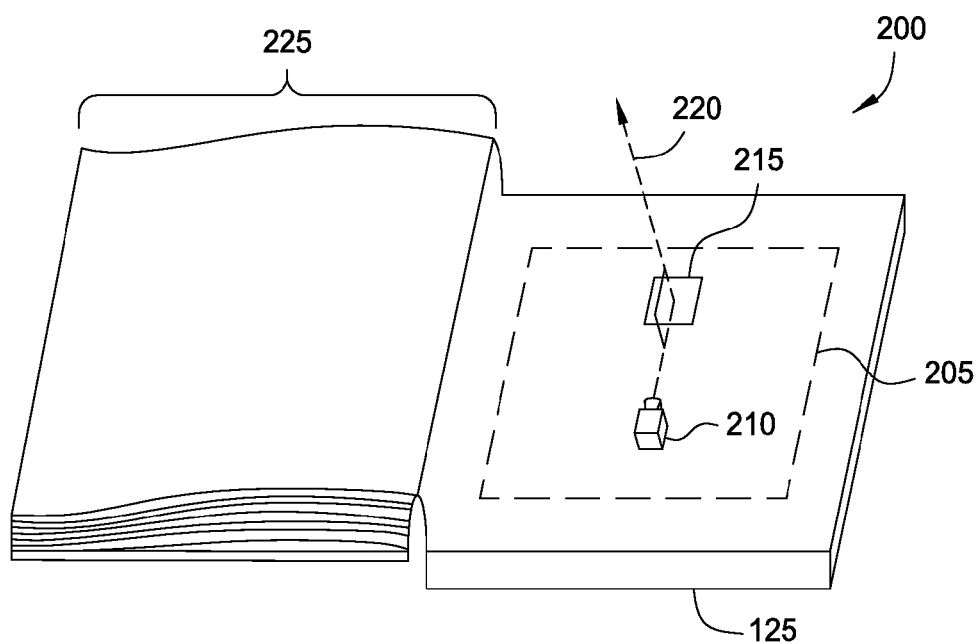
FIG. 2 illustrates a projection system integrated into a book, according to one embodiment described herein.

FIG. 2 illustrates a projection system integrated into a book 200, according to one embodiment described herein. Here, the pages 225 of the book 200 have been flipped to left thereby exposing the inner surface of the electronic storage portion 125. The cut-out box 205 provides a view of the inside of the casing of the electronic storage portion 125. As shown, a projector 210 is mounted on the casing of the electronic storage portion 125 such that the light emitted by projector 210 travels in a direction substantially parallel to the back cover of the book 100—e.g., the outer surface of the electronic storage portion 125. The emitted light then strikes a mirror 215 which may be positioned at approximately a 45 degree angle relative to the incident light. The mirror 215 may reflect the light at a 90 degree angle such that it travels in a direction perpendicular to the back cover. When a page 225 is flipped over onto the right side of book 200, the light emitted by the projector 210 is reflected by the mirror 215 onto the page 225. As discussed above, the projector may control the light such that an image or animation is displayed on the page 225.

The arrangement of the projector 210 and mirror 215 is only one example of displaying an image on a page 225. In one embodiment, the mirror 215 may be omitted and the projector 210 may emit light directly at a page 225 rather than redirecting the light as shown in book 200. Moreover, projector 210, mirror 215, or both may be adjustable. For example, the particular orientation of these components may be adjusted by a control system in the book 200 that enables the image or animation to be displayed at different locations on a page 225. In another example, the book 200 may contain multiple lenses or multiple optical paths that the projector 210 may use to display images at different locations on page 225. In one embodiment, the book 200 may not need any mechanical elements in order to change the image placement on the page 225. Moreover, in other embodiments, the electronic storage portion 125 may include multiple projectors 210 for displaying more complex images onto the pages 225.

The projector 210 may be any light source capable of displaying an image on a book page. For example, projector 210 may be a laser light source, LED projector, image light amplifier, and the like. In one embodiment, the projector 210 may be a light source that does not require focusing in order to produce a clear image at various distances. For example, a laser light source can generate a focused image on a page even as the distance from the page to the projector 210 varies. Thus, the book 200 does not need to calculate or estimate the current distance from the page to the projector 210 to generate a focused image on a page 225.

In one embodiment, projector 210 may generate an image or animation using multiple colors. For example, projector 210 may include multiple light sources that each transmits light at a different wavelength—i.e., a different color—which may then be controlled to generate a color image. However, in other embodiments, the projector 210 may emit light with a single color or various shades or tints of the same color.

Figure 3:
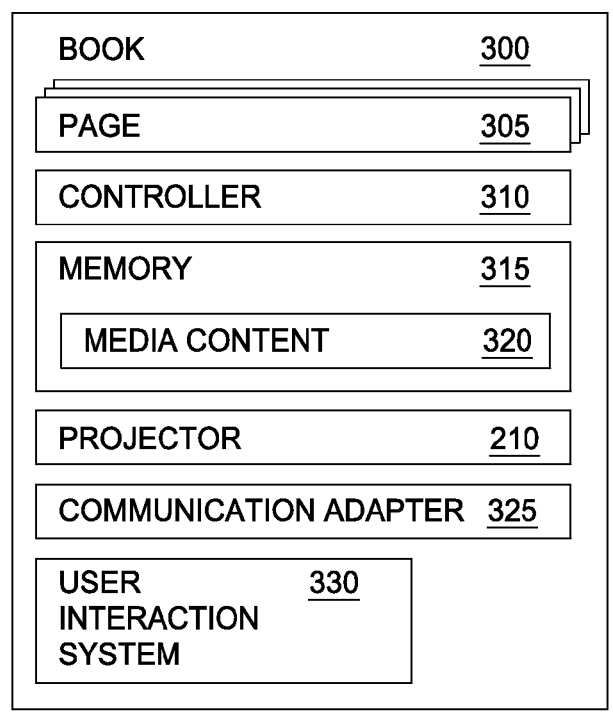
FIG. 3 illustrates the components of an interactive book, according to embodiments described herein.

FIG. 3 illustrates the components of an interactive book 300, according to embodiments described herein. Book 300 includes one or more pages 305, a controller 310, a memory 315, projector 210, a communication adapter 325, and a user interaction system 330. In one embodiment, pages 305 are made of cellulose pulp derived from wood, rags, or grasses that are dried into flexible sheets. The embodiments herein are not limited to any particular material for the pages 305 so long as the material is sufficiently translucent to permit light projected on one side of the page 305 to be visible on the other side. In one embodiment, the pages 305 may be made of paper with a basis weight less than or equal to 40 to 50 pounds.

In one embodiment, the projector 210 may project the image through multiple pages 305. For example, if the book 300 includes ten pages 305, even if all ten of the pages 305 re on one side of the book 300, the projector 210 may project the image through the nine underlying pages 305 until the image reaches the tenth page 305 and is viewable to the user. This may require using thinner pages 305 or using a material that is more translucent than would be required if the book 300 contained fewer pages. Additionally, the printed text on the pages may arranged such that the light is not projected through these portions. That is, the text may increase the opaqueness of the page 305, and thus, when projecting the image through multiple pages 305, the text on the multiple pages 305 may be arranged such that the light may pass through the intermediate or underlying pages without striking the text.

In one embodiment, the book 300 may adjust the power used by the projector 210 depending on the number of pages 305 the projector 210 must project the image through to reach the user. For example, the projector 210 may use less power when projecting through only two pages 305 than when projecting an image through four pages 305. Doing so may ensure that the user sees an image with a substantially constant brightness regardless of whether the current page being viewed by the user is the first page 305 or the last page 305 in the book 300. Although not shown, the book 300 may include a page sensor that monitors which page is currently opened and viewable to the user so that the book 300 can appropriately bias the power of the projector. Additionally, adjusting the output of the projector 210 may conserve power and thus reduce the number of times that a battery in book 300 needs to be recharged or replaced.

The controller 310 may be a processing element (e.g., a microprocessor) used to control the various components in book 300. For example, the controller 310 may include firmware or execute an application that performs the functions described herein such as determining what image to display using the projector 210, adjust the orientation of the components in the book 300 so that the light strikes a specific portion of each page 305, controlling the user interaction devices 330, and communicating with external environmental devices. Controller 310 may be a general-purpose processor or an ASIC.

Memory 315 may include volatile or non-volatile memory elements. Examples of volatile memory include DRAM or SRAM while examples of non-volatile memory include EEPROM, Flash memory, hard disk drives, and the like. As shown, memory 315 may store media content 320 which contain the images to be displayed by the projector 210. For example, the media content 320 may provide a different image or animation for each page 305 in the book 300. As the user thumbs through the pages, the controller 310 may instruct the projector 210 to display the image or animation corresponding to current page 305. In one embodiment, the media content 320 may be changed or updated. For example, the communication adapter 325 (e.g., a USB, firewire, Ethernet, wireless 802.11 connection) may facilitate establishing a communication link with another computing device which permits the user to change or delete the media content 320. For example, a parent may change the media content 320 as the child ages—e.g., new media content 320 is uploaded that is more age appropriate. Thus, even if the printed text of the pages 305 remains the same, the media content 320 may be altered to change the user's experience.

In one embodiment, the controller 310 may use the communication adapter 320 to communicate and transmit instructions to devices that alter the surrounding environment to provide a more immersive experience for the user. As will be described in more detail below, the controller 310 may directly or indirectly control a sound system, television, lighting system, and other environmental control device to supplement the story or images displayed on the pages 305 of the book 300.

Generally, the user interaction system 330 can either be a system that provides output to a user or a system that the user is able to use to transmit input to the book 300. One example of system 330 that provides output to the user is a built-in speaker that plays a sound that corresponds to the image being displayed—e.g., music which a displayed, animated character dances to, sound effects from a sword fight, and the like. Alternatively, the user interaction system 330 may be a force-feedback system that provides vibrations that correspond to the story or the current image displayed by the projector 210. For example, if the book 300 is currently displaying a rockslide on page 305, the user interaction system 330 may cause the book to vibrate.

Examples of a user interaction system 330 that enable a user to provide input to the book 305 include a touch system, voice recognition module, motion tracking system, keyboard/button, and the like. In one embodiment, book 300 may include a touch panel integrated into the page 305. For example, the page 305 may include a plurality of embedded electrodes that may enable a touch sensor to detect user interaction with the page. Alternatively, the touch sensor may be disposed on the inner surface of the electronic storage portion 125 shown in FIG. 2. Thus, as the user's finger presses on a page resting on top of the electronic storage portion 125, the touch sensor may detect the finger's presence and change the image being displayed on the page.

In another embodiment, instead of using a touch sensor, the user interaction system 330 may be a motion tracking system that includes a camera that tracks the motion of the user's finger or hand relative to a location on the page 305. By tracking the user's hand, the book 300 may change the image displayed on the page 305 as the user waves her hand over the page 305. The user interaction system 330 may in other embodiments be a voice recognition system, keyboard, buttons, touchpad, etc. Furthermore, the user interaction system 330 may include various sensors such as accelerometers or gyroscopes that permit the user to physically move the book 300 to interact with a storyline presented in the book. For example, as the user tilts the book 300, the book 300 may change the location of a displayed image on the page based on the data outputted by a gyroscope. However, the book 300 is not limited to the example systems 330 disclose herein and may include any interface system that permits the user to interact with the storyline or the displayed images in the book. Additional details regarding how a user may interact with the book 300 using the user interaction system 330 will be discussed in greater detail below.

In one embodiment, the book 300 may use the user interaction system 330 to present a game to the user. For example, the book 300 may use an output device such as the projector 210 or a speaker to provide instructions to the user. Examples of such instructions may be turning to a particular page 305, touching a particular portion of the page, speaking a certain phrase, shaking the book 300, and the like. The book 300 may then use the user interaction system 330 to determine whether the user followed the instruction. In one embodiment, the book 300 may track the user's progress and update the game based on the whether the user carried out the instruction. For example, the image displayed by the projector 210 may change depending on the user's actions. Furthermore, the game parameters may define rewards or points earned by the user for following the instructions. In one example, as the user earns more points, more media content 320 may be unlocked and displayed to the user.

FIGS. 4A-4D illustrates book pages 410, 415, and 420 with translucent or open portions for displaying images, according to embodiments described herein. As described above, the book 400 includes pages 410, 415, and 420 which display an image on a front side of the page facing the user based on an image emitted from the electronic storage portion 125 that strikes the back side of the page. Here, the front cover 405 of the book 400 may be any typical cover while the back cover may include the electronic storage portion 125 which contains an aperture 422 that permits the light emitted from a projector (not shown) to reach different portions of the pages 410, 415, and 420.

Figure 4A:
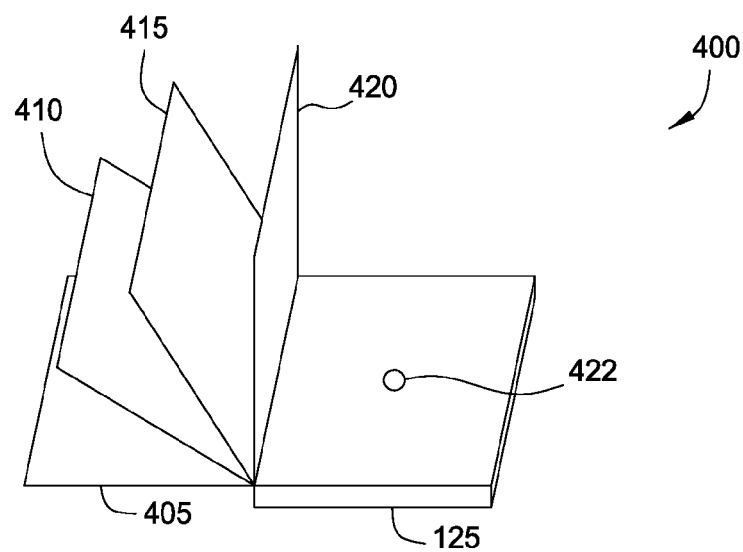
FIGS. 4A-4D illustrates book pages with translucent or open portions for displaying images, according to embodiments described herein.
Figure 4B:
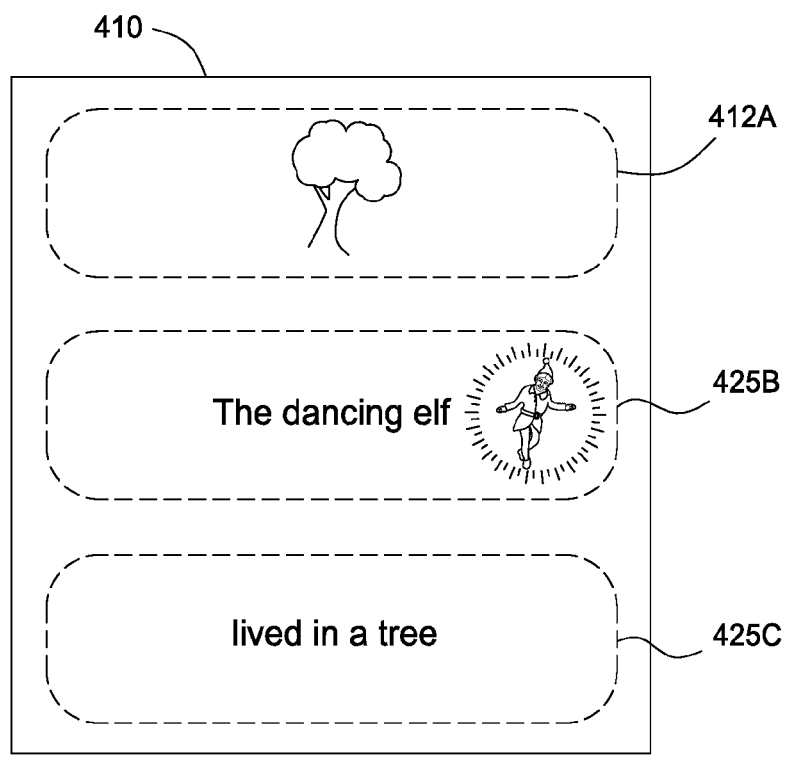
Figure 4C:
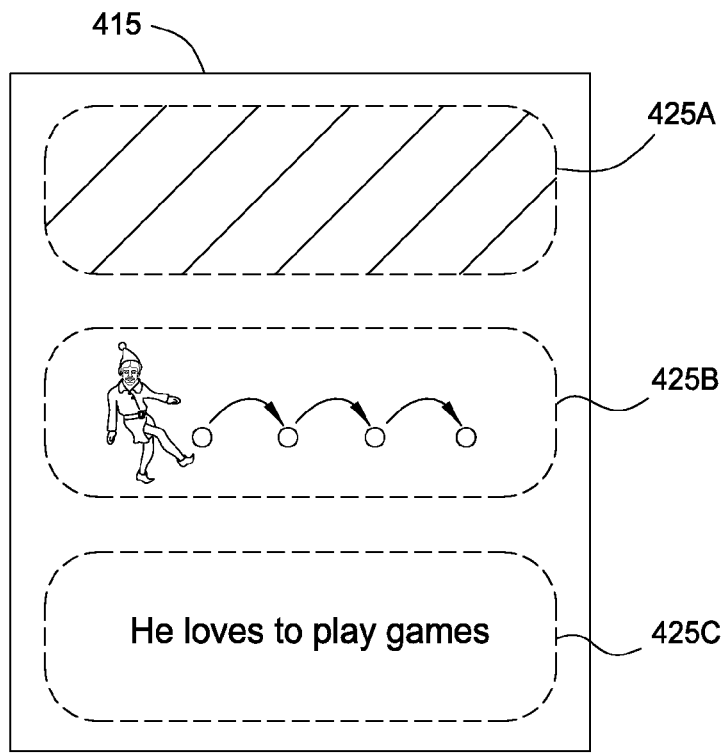
Figure 4D:
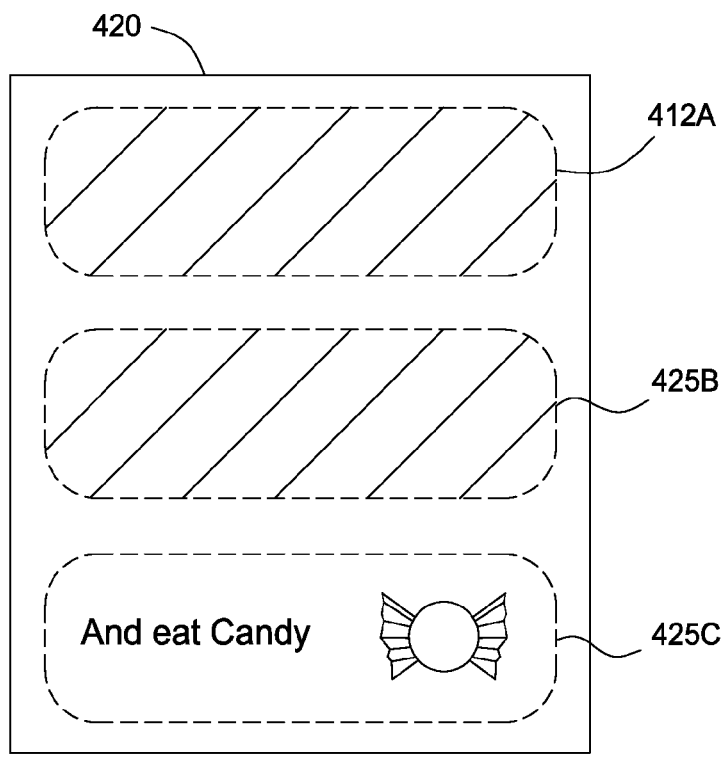

FIGS. 4B-4D illustrate the respective pages 410, 415, and 420 in greater detail. FIG. 4B illustrates the first page 410 in book 400 which is divided into three different portions 425A-C. The boundaries of the portions 425 may be visually demarcated in the book or may be design parameters that are undetectable by a user viewing the page 410. As shown in FIGS. 4B-4D, the portions 425A-C are at the same location on each of the respective pages 410, 415, and 420. Thus, when the user is viewing the first page 410, portion 425A on page 410 aligns with and overlaps portion 425A on page 415 and portion 425A on page 420, and so forth.

In FIG. 4B, the projector displays an image on portion 425A that may correspond to the text in portions 425B and 425C. For example, once the user opens the page, book 400 may display in portion 425A an elf climbing into a tree. In one embodiment, the material of portion 425A may be a different material than portions 425B and 425C. For example, the book 400 may not display an image on portions 425B and 425C and thus use a material that is not translucent (e.g., thick cardboard) but use a translucent material for portion 425A (e.g., rice paper or a thin stock paper). Doing so may reduce costs and provide additionally durability to page 410.

FIG. 4C illustrates the second page 415 which has the same portions 425A-C defined above. Unlike in page 410, however, page 415 may have a cutout at portion 425A—e.g., portion 425A defines an open area. Thus, when displaying an image on page 410, the light from the electronic storage portion 125 is able to pass unimpeded through portion 425A on page 415. This may enable the use of a less powerful projector or conserve battery life since the image does not need to travel through a solid material before reaching portion 425A on page 410. Instead of defining portion 425A in page 415 as a window, in one embodiment, page 415 may be two-thirds the size of page 410 where page 415 only overlaps the bottom two-thirds of page 410. Further still, instead of leaving portion 425A open, page 415 may include a clear plastic or other highly translucent material that has a nominal affect on the light emitted by the projector.

Portion 425B of page 415 may be assigned to display an image from the projector. Like portion 425A of page 410, portion 425B of page 415 may be made of a material suitable for allowing the image or animation (i.e., the elf kicking a ball) to pass through the rear-side of the page 415 to the front-side of the page 415. This image may correspond to the text in portion 425C to further immerse the user in the story.

FIG. 4D illustrates the third page 420 in the book 400. Here, both portions 425A and 425B may be an open area or include a highly translucent material that permits light to pass substantially unimpeded. Because displaying images on either page 410 or page 415 means that light passes through the boundaries of page 420, portions 425A and 425B serve as conduits to improve the efficiency this transmission. Instead of leaving portions 425A and 425B as cutouts, page 420 may be shrunk to only a third the size of page 410 and align to the bottom third of page 420 to allow the light to travel from the electronic storage portion 125 to either page 410 or page 415. Although portions 425A and 425B are unused in page 420, portion 425C of page 420 may be used to display printed text or an image (i.e., the piece of candy) projected from the electronic storage portion 125.

By using defined, overlapping portions, the various portions 425 may be reserved for a particular function. Because displaying an image on the rear-side of the first page 410 may require transmitting light through the boundaries of the second and third pages 415, 420, these underlying pages may include conduits that permit the light to pass efficiently. Although FIGS. 4B-4D illustrate using three portions, the pages 410, 415, 420 may include any number of logical portions in each page that may be reserved for a particular function or functions as discussed above. Furthermore, one or ordinary skill will recognize that the examples provided above may be extended to any number of pages.

Figure 5:
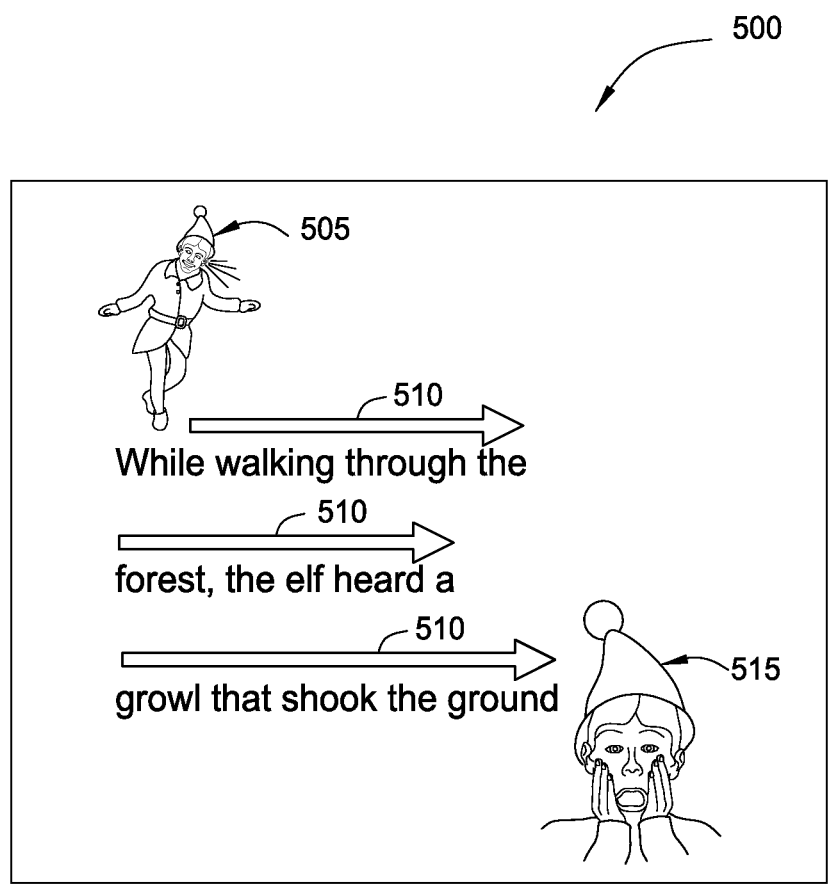
FIG. 5 illustrates an interactive book responding to a user's voice, according to one embodiment described herein.

FIG. 5 illustrates a page 500 of an interactive book responding to a user's voice, according to one embodiment described herein. Specifically, the book may contain a user interaction system that receives and decodes a user's spoken words. Based on the decoded words, the book may control the image being displayed on the page 500. In the illustrated embodiment, the book may detect if the user is reading the text printed on page 500. As the user speaks the subsequent word in the printed text, the book may move the image 505 to correspond to the word being spoken as shown by the arrows 510. For a child learning to read, the image 505 provides positive affirmation that the correct words are being spoken. If the user does not speak the correct word, the image 505 may remain on the current word until the correct word is spoken.

In addition to moving the image 505 as the corresponding words are spoken, the image 505 may change. For example, as the image 505 moves in the direction of arrows 510, the image 505 may appear to the user like it is running, jumping, dancing, and the like. Moreover, the displayed image 505 may react to the context of the words. Here, at the end of the sentence, the image 505 may turn into image 515 which shows an emotion that corresponds to the story (i.e., the elf is nervous or scared).

Figure 6A:
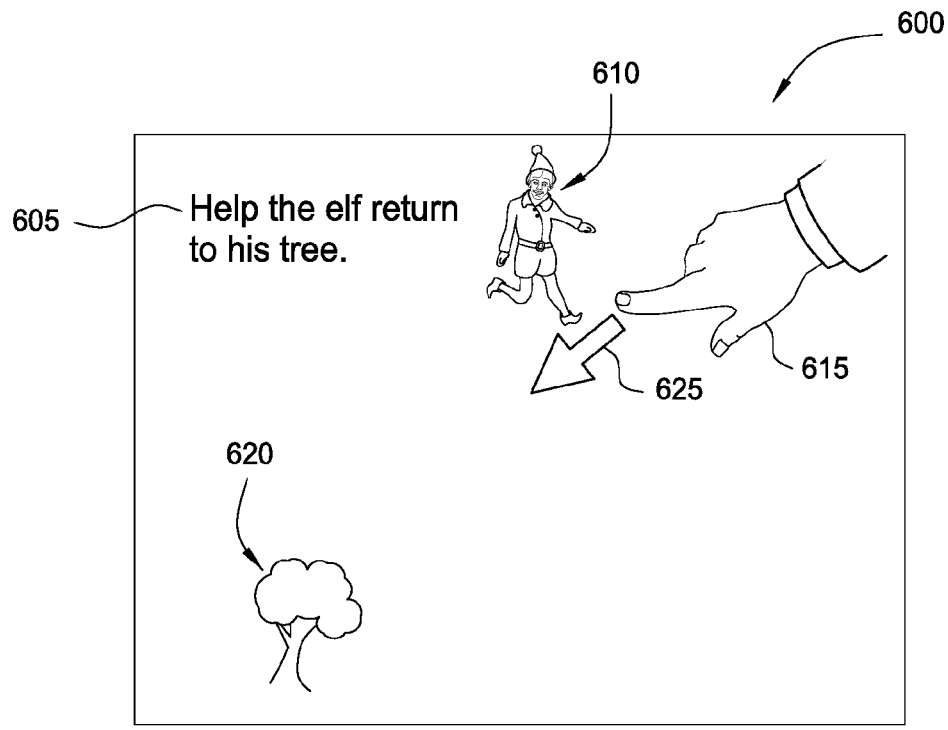
FIG. 6A-6B illustrate an interactive book responding to user interaction, according to one embodiment described herein.
Figure 6B:
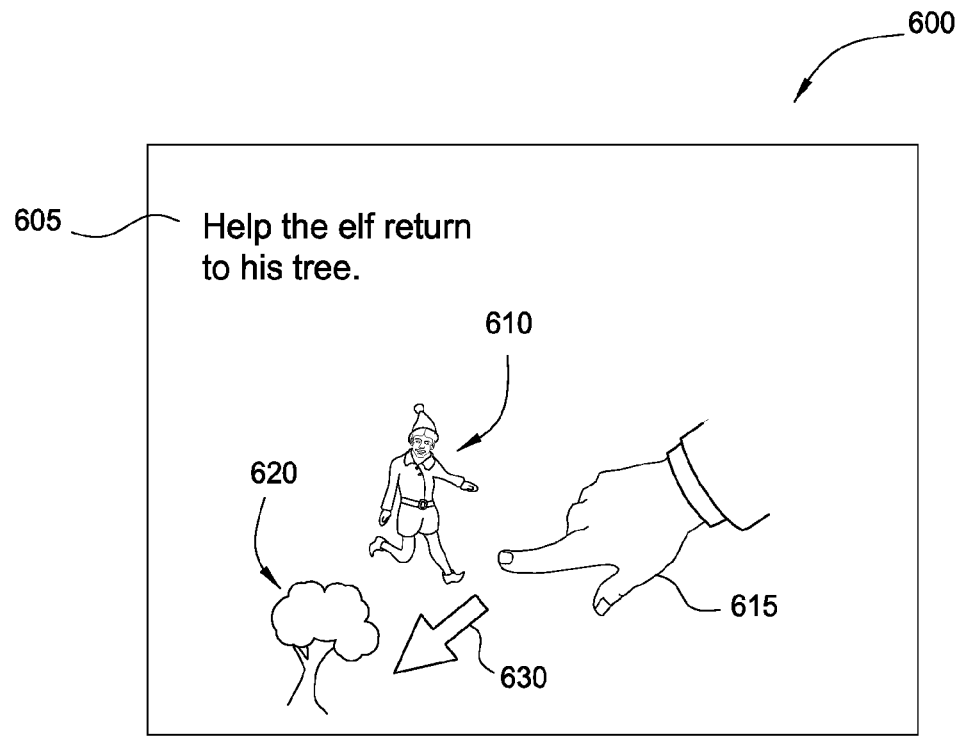

FIG. 6A-6B illustrate an interactive book responding to user interaction, according to one embodiment described herein. To do so, the book may include a user interaction system that tracks the movement of an object that contacts or is proximate to page 600. The user interaction system may include a touch sensor (e.g., capacitive or resistive touch sensor), motion tracking system, and the like. As shown here, the book may detect a user interaction between page 600 and an input object 615 (e.g., a user's finger or stylus). The user interaction may be the object 615 contacting the page or coming within close proximity to the page. For example, a capacitive sensor or video tracking system may be able to detect a location of the object 615 on page 600 without the object 615 physically contacting the page 600.

A capacitive sensor may detect a change in capacitance when the object 615 is near the page 600—e.g., hovering at a close proximity to page 600.

In FIG. 6A, page 600 provides a textual instruction to the user who then uses object 615 to perform the instruction. As shown by arrow 625, the user may place object 615 over a location of the image 610 and drag the object 615 to the destination image 620. The two images 615 and 620 may either be displayed from the same projector or by two different projectors in the book. Alternatively, image 620 may be printed onto the page 600 rather than being a projected image. FIG. 6B illustrates the updated position of image 610 after the user drags object 615 to a new location on the page 600. Specifically, the book relies on the user interaction system to track the object 615 and update the position of image 610 based on the current location of object 615. If the object 615 continues to move in the direction shown by arrow 630, image 610 may overlap image 620 in which case the book causes a particular event to occur that signifies to the user that the textual instructions were completed—e.g., the elf image 610 may climb into the tree 620 or the book may play a particular sound.

Generally, a user interaction system allows the book to update the displayed image in the same manner as if an electronic device—e.g., a laptop, tablet, smartphone, and the like—was used. Thus, the interactive book is able to behave like an electronic device yet have the same form factor and printed material that is characteristic of printed media. For example, the printed page 600 may include integrated sensor electrodes coupled to a touch sensor that detects changes in capacitance. These sensor electrodes may be transparent or thin enough such that they do not substantially impede the light striking the page. Alternatively, instead of integrating the electrodes into page 600, the book may include a touch-sensitive substrate such that when page 600 is placed on top of the touch-sensitive substrate, the book can detect when a user interacts with the page using object 615, even if multiple pages are on the substrate. Doing so may be advantageous since electrodes do not need to be integrated into each page in order to detect user interaction.

If an motion tracking system is used, the system may track the object 615 by, for example, detecting the shadow the object 615 produces on the page. The book may contain a sensor located at the back or front cover of the book. By determining the luminosity difference between a portion of the book where the object's shadow hits the book and where the ambient light hits the book directly, the tracking system may identify a location of object 615. The book may then update the position of image 610 as shown in FIGS. 6A and 6B. Alternatively, the book may include a mounted video camera that may track the object 615 as it approaches page 600. In this embodiment, the camera may be mounted such that page 600 does not block the view of the camera from detecting object 615—e.g., the camera may be mounted along one of the sides of the book.

Instead of touch sensing or motion tracking, the user may interact with the book using a trackball, arrow keys/buttons, or other I/O device. For example, the user may use the arrow keys or trackball to move image 610 as shown. By including a user interaction system in the book, the book can interact with the user as if it were a stand alone electronic device. Thus, the user can use an interaction system she is familiar with (e.g., touch sensors or a trackball) to change the image or the location of the image on the page 600.

Figure 7:
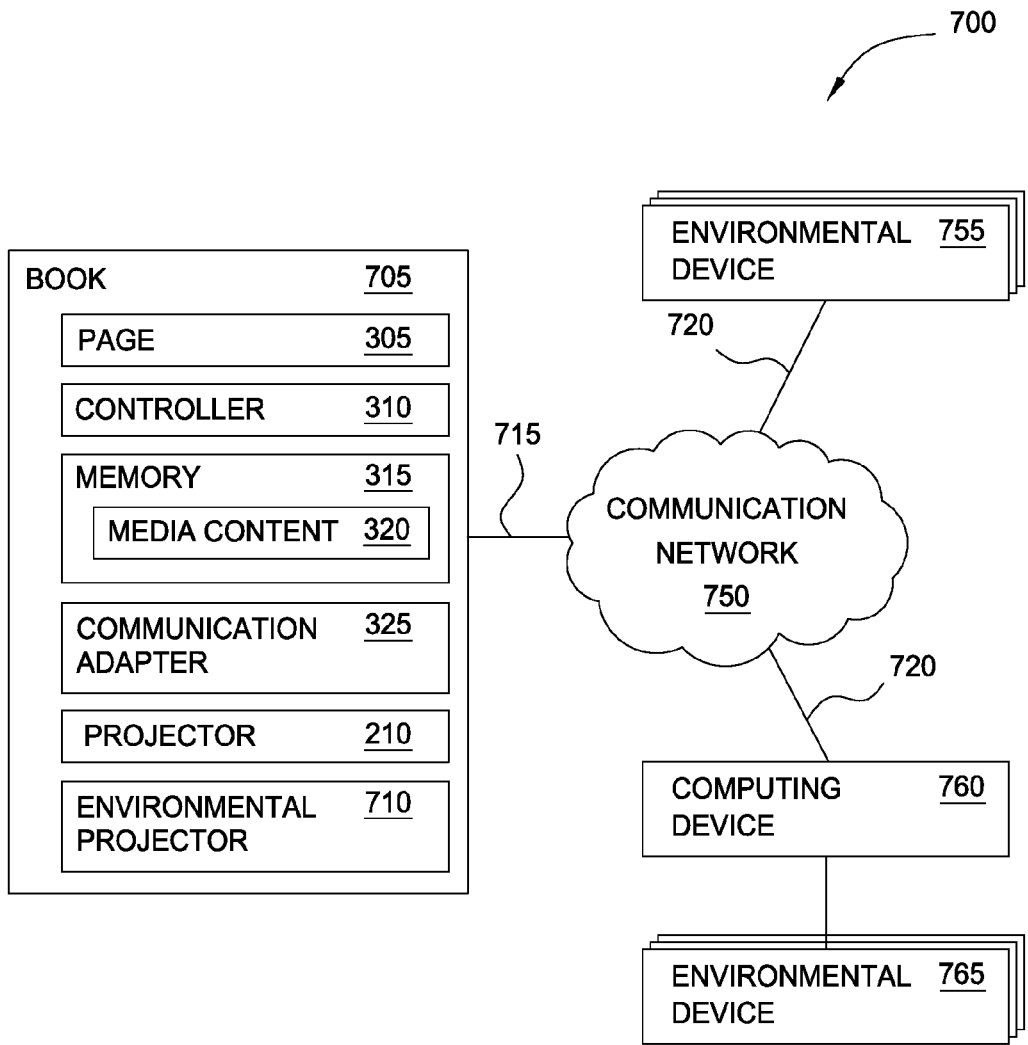
FIG. 7 illustrates a system for creating an immersive environment using a book coupled to a communication network, according to one embodiment described herein.

FIG. 7 illustrates a system 700 for creating an immersive environment using a book 705 coupled to a communication network 750, according to one embodiment described herein. System 700 includes book 705, communication network 750, one or more environmental control devices 755, 765, and a computing device 760. Book 705 includes many of the same components discussed in FIGS. 2 and 3, and thus, these components will not be described in detail here. As shown, book 705 includes an environmental projector 710 which may be used to project an image onto an external object. In contrast to projector 210, projector 710 transmits a light to be display, for example, onto an object in the physical environment surrounding the book 705. The image transmitted by projector 710 may supplement the image transmitted on page 305 by projector 210.

In one embodiment, book 705 uses the communication adapter 325 to send instructions to the environmental devices 755, 760 via the communication network 750. The book 705 may establish a communication link 715 to the network 750 that may be wireless or wired connections. The communication network 750 may be wide-access network (e.g., the Internet) or a local-access network. In one embodiment, the network 750 may be omitted and the book 705 may directly connect to the environmental device 755 or computing device 760. For example, the book 705 may include an infrared or RF transmitter than sends instructions directly to the environmental device 755.

As shown, communication network 750 includes respective communication links 720 to the environmental device 755 and the computing device 760 which may be wired or wireless connections. Generally, the communication links 715 and 720 may be based on any type of communication protocol—e.g., Ethernet, 802.11 wireless connection, infrared, RF, and the like.

Instead of having direct connections to the communication network 750, environmental devices 765 are connected to the communication network 750 through computing device 760. The computing device 760 may serve as an intermediary between environmental devices that lack the sophistication to communicate directly with the communication network 750. For example, environmental device 765 may be a basic switching system that controls the lights in the surrounding environment. By coupling device 765 to the computing device 760, the computing device 760 may receive the instructions from the book 705 and control the environmental device 765 based on those instructions. Regardless of whether the devices 755, 765 are directly or indirectly coupled to the network 750, the communication network 750 facilitates instructions from the book 705 to reach the environmental devices 755, 765, and vice versa.

In addition to using the projector 210 to display images on pages 305, book 705 may use the communication adapter 325 to transmit instructions to the environmental devices 755 to alter or change the environment associated with book 705. As used herein, the environment is a defined space where changes therein affect the user reading the book 705. For example, the environment may be a room in a house where the user is currently reading the book 705. The book 705 may be able to locate environmental devices 755, 765 that are located in the same environment as the book 705 and send instructions to the identified environmental devices 755, 765 to change the lighting of the environment, play a sound, display a supplemental image or video, and the like. As such, the environmental devices 755, 765 may be any device that alters a characteristic of the environment that is detectable by the user's senses. Examples of the environmental devices 755, 765 include sound systems, display systems (televisions, external projectors), lighting systems that adjust the intensity of environmental lighting, scent dispensing systems, interactive toys, tactile-feedback systems, and the like.

In one embodiment, the image displayed by projector 210 may be synchronized with the environmental devices 755, 765. For example, if the book 705 displays an image of a dancing elf, the book 705 may transmit an instruction to a sound system to play a song corresponding to the elf. Or, if the book 705 determines that the user has opened a page 305 whose text says that it is a dark and stormy night, the book 705 may dim the lights in the environment and instruct a sound system to play thunder while instructing a display system to flash lightning on a screen. In addition to supplementing the textual story or the image projected on page 305, the book 705 may send instructions to the environmental devices 755, 765 based on user interaction with the book. For example, the book 705 may wait for a voice-recognition module to detect that the user spoke the words "it was a dark and stormy night" before activating the environmental devices 755, 765 as discussed above. Or the book 705 may wait until an integrated touch sensor determines that the user has used her finger to make a predefined motion on the page 305 before sending instructions to the environmental devices 755, 765. In this manner, the book 705 may control the environmental device 755, 765 based on user interaction with the page 305.

Conclusion

To immerse a user in a book, the embodiments presented above describe integrating a projector in the book that displays images or animations on one or more pages of the book. Specifically, the book may include a projector that is arranged in the form factor of the book. The book may also contain one or more mirrors that reflect an image emitted by the projector onto a desired location on a page in the book. In one embodiment, the image is projected onto a back side of the page that is opposite a front side of the page currently facing the user. So long as the material of the page is sufficiently translucent, the image projected on the back side of the page will be visible to the user looking at the front side of the page.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A document, comprising:
a front cover and a back cover;
at least one translucent page between the front and back covers and containing printed text; and
a projector mounted between the front and back covers, the projector is configured to transmit an image onto a rear side of the translucent page that is opposite a front side of the translucent page being viewed by a user, the translucent page being adapted to allow the image to pass through the translucent page and be displayed on the front side of the translucent page.

2. The document of claim 1, further comprising:
an electronic storage portion encasing the projector, wherein the electronic storage portion is between the translucent page and one of the front cover and back cover.

3. The document of claim 2, wherein the projector is mounted in the electronic storage portion such that light is emitted from the projector in a first direction substantially parallel with one of the front and back covers, the electronic storage portion comprising a mirror oriented to, before the light strikes the rear side of the translucent page, redirect the light emitted from the projector in a second direction different from the first direction.

4. The document of claim 2, wherein the electronic storage portion includes a first surface facing the rear side of the translucent page and a second surface facing the back cover, the first surface including an aperture through which the image passes to reach the rear side of the translucent page and the second surface is connected to the back cover, and wherein the boundaries of the electronic storage portion are within the boundaries established by the front and back covers.

5. The document of claim 1, wherein the projector is configured to transmit the image through a plurality of pages before the image reaches the rear side of the translucent page.

6. The document of claim 1, further comprising a user interaction system for detecting input from the user, wherein the image transmitted by the projector is altered based on the detected user input.

7. The document of claim 1, further comprising:
a processing element configured to control the image emitted by the projector; and
a memory comprising media content, the media content defining a plurality of images to display on the translucent page.

8. The document of claim 1, wherein the projector is configured to project a series of distinct images onto the rear side of the translucent page that is opposite the front side of the translucent page being viewed by a user.

9. A system, comprising:
a document, comprising:
a front cover and a back cover,
at least one translucent page between the front and back covers and containing printed text,
a projector mounted between the front and back covers, the projector is configured to transmit an image onto a rear side of the translucent page that is opposite of a front side of the translucent page being viewed by a user, the translucent page being adapted to allow the image to pass through the translucent page and be displayed on the front side of the translucent page, and
a communication adapter; and
an external environmental altering device configured to receive an instruction via the communication adapter and alter a physical environment that includes the document.

10. The system of claim 9, wherein altering the physical environment includes altering at least one of the light, sound, or scent in the physical environment.

11. The system of claim 9, further comprising a computer network that facilitates communication between the communication adapter of the document and the environmental altering device, wherein the communication network receives the instructions from the communication adapter and forwards the instructions to the environmental altering device.

12. The system of claim 9, wherein the document transmits the instruction to the environmental altering device to synchronize a concept presented in the printed text of the translucent page with a characteristic of the physical environment.

13. A method for displaying an image on a translucent page of a document, the method comprising:
instructing a projector integrated into the document to emit the image, wherein the projector is mounted between a front cover and a back cover of the document; and
emitting the image from the projector onto a rear side of the translucent page of the document that is opposite a front side of the translucent page being viewed by a user such that the image passes through the translucent page and is displayed on the front side of the translucent page.

14. The method of claim 13, wherein the projector is encased in an electronic storage portion, the electronic storage portion is between the translucent page and one of the front cover and back cover.

15. The method of claim 14, wherein the projector is mounted in the electronic storage portion such that light is emitted from the projector in a first direction substantially parallel with one of the front and back covers, the electronic storage portion comprising a mirror oriented to, before the light strikes the rear side of the translucent page, redirect the light emitted from the projector in a second direction different from the first direction.

16. The method of claim 13, wherein the projector is configured to transmit the image through a plurality of pages before the image reaches the rear side of the translucent page.

17. The method of claim 13, further comprising:
   detecting an interaction between the user and the document; and
   altering the image based on the user interaction.

18. The method of claim 13, wherein the projector emits an animation comprising the image, the method further comprising:
   moving the animation to different locations on the translucent page.

19. The method of claim 13, further comprising:
   transmitting an instruction to an external environmental altering device configured change a physical environment that includes the document.

20. The method of claim 19, wherein altering the physical environment includes altering at least one of the light, sound, or scent in the physical environment.

21. The method of claim 19, wherein the instruction synchronizes a concept presented in the printed text of the translucent page with a characteristic of the physical environment.

\* \* \* \* \*